United States Patent
Suzuki et al.

[11] Patent Number: 6,089,438
[45] Date of Patent: Jul. 18, 2000

[54] ULTRASONIC WELDER

[75] Inventors: Masataka Suzuki; Hiroyuki Ashiya; Yoshiyuki Tanaka; Shinobu Mochizuki, all of Tokyo; Kouji Koike, Shizuoka, all of Japan

[73] Assignee: Yazaki Corporation, Tokyo, Japan

[21] Appl. No.: 08/694,448

[22] Filed: Aug. 12, 1996

[30]  Foreign Application Priority Data

Aug. 14, 1995 [JP] Japan .................................... 7-206880

[51] Int. Cl.[7] .................................................. B23L 20/10
[52] U.S. Cl. ...................................... 228/1.1; 156/580.2
[58] Field of Search .................................. 228/1.1, 110.1, 228/51; 156/73.1, 580.2; 29/872

[56]  References Cited

U.S. PATENT DOCUMENTS 3,756,900  9/1973  Michel ....................................... 228/1.1
4,757,933  7/1988  Hawkins et al. .......................... 228/1.1

FOREIGN PATENT DOCUMENTS 1-139986  9/1989  Japan .

Primary Examiner—Samuel M. Heinrich
Attorney, Agent, or Firm—Armstrong, Westerman, Hattori, McLeland & Naughton

[57]  ABSTRACT

In order to achieve reliable welding, by reducing welding scars, of a flat conductor to another bonding member by an ultrasonic welding machine, a curved beveled portion facing a bonding member, a plurality of indented grooves running at a right angle to the direction of vibration of the horn tip and flat surfaces, which come in contact with a bonding member, are formed at either one of or both of the horn tip and the anvil, wherein the curved beveled portions, the indented grooves and the flat surfaces are formed facing opposite a low strength conductive member, and the indented grooves are formed at a width that is smaller than that of the flat surfaces provided between the individual indented grooves and curved beveled portions are formed at the edges where the indented grooves meet the flat surfaces.

4 Claims, 4 Drawing Sheets

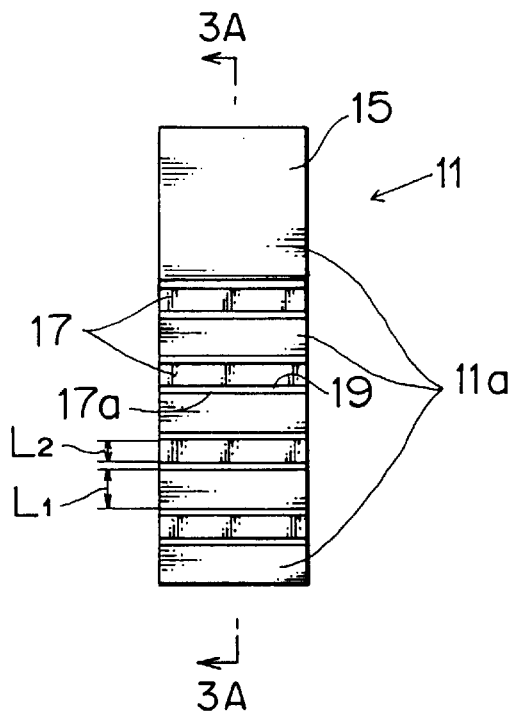
FIG. 2
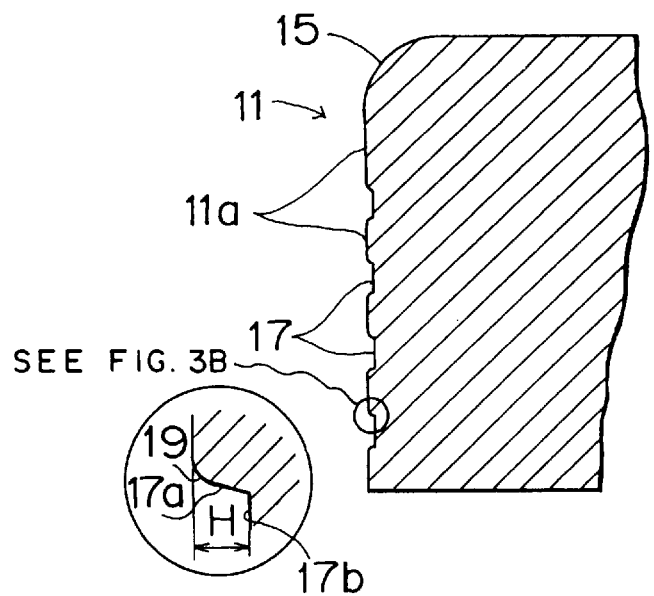
FIG. 3A
FIG. 3B

ULTRASONIC WELDER

BACKGROUND OF THE INVENTION

1. Field of the Invention

The present invention relates to an ultrasonic welding machine that is capable of reliably welding a low strength conductive member such as a flat conductor or the like to another bonding member by reducing welding scars caused by the horn tip or the anvil.

2. Description of the Prior Art

In FIG. 4, there is shown an ultrasonic welding machine. At the front end of the horn of the ultrasonic welding machine 25, a horn tip 26, which constitutes a welding head, is secured, and an anvil 28, which also constitutes another welding head, is secured on a base body 27 facing opposite the horn tip 26. Bonding members are set on the anvil 28, the horn 29 is lowered until it comes in contact with the bonding members and the horn tip 26 vibrates in the lengthwise direction ultrasonically so that bonding members become connected to each other through welding.

The bonding members may be, for instance, a copper plate member 30 and a flat conductor 32 of a flat cable 31 or a copper foil. As shown in FIG. 5, at another end of the copper plate member (joint member) 30, a stranded conductor 34 of an electric wire 33, for instance, is welded in a similar manner and, thus, the flat cable 31 and the electric wire 33 are electrically connected.

As shown in FIGS. 6 and 7, cross-shaped indentations and projections 35 and 36, for instance, are formed at a lower end surface (machining surface) of the horn tip 26, so that ultrasonic waves can be communicated to the bonding members with a high degree of efficiency (Japanese Utility Model Application Laid Open No. H01-139986).

However, when welding a low strength conductive member such as the flat conductor 32, a copper foil or the like using the horn tip 26 provided with the cross-shaped indentations and projections 35 and 36, since the projections 36 are in contact diagonally relative to the lengthwise direction of the low strength conductive member 32 and the projections intersect one another at right angles, the flat conductor 32, for instance, tends to form an indented welding scar 37 relative to the copper plate member 30 such as a bus bar, as shown in FIG. 8. Measurements of peeling strength obtained by pulling vertically relative to the bonding surface 38 demonstrate that in such a case, peeling does not start from the bonded portion 38 but rather a break is more likely to start from the root 39 of the bonded portion and that the welding scar 37 reduces the strength of the low strength conductive member such as the flat conductor 32 or the like.

SUMMARY OF THE INVENTION

Accordingly, it is an object of the present invention to provide an ultrasonic welding machine that is capable of reliably welding a thin conductive member, i.e., a low strength conductive member such as a flat conductor, a metal foil or the like, to another bonding member, such as a bus bar, a stranded conductor or the like, by reducing welding scars caused by the horn tip.

In order to achieve the object described above, the essential features of the ultrasonic welding machine according to the present invention, which connects various bonding members to each other through welding between the horn tip and the anvil, include a curved beveled portion facing the bonding members, a plurality of indented grooves that run at a right angle to the direction of vibration of the horn tip and flat surfaces that come in contact with the bonding member, all of which may be formed at either one of or both the horn tip and the anvil.

Further, in order to achieve the object, the structure may have the curved beveled portion, the indented grooves and the flat surfaces formed facing opposite the low strength conductive member, such as a flat conductor, which constitutes one of the bonding members. The indented grooves may be formed so that their width is smaller than that of the flat surfaces between them, with curved beveled portions being formed at the edges between the grooves and the flat surfaces.

In an ultrasonic welding apparatus such as described above, the curved beveled portions of the horn tip or the anvil come in contact with a bonding member, such as a low strength conductive member, smoothly and the shearing stress applied to the bonding member is reduced. In addition, the indented grooves impart a holding force relative to the bonding member to evenly disperse the pressure generated during ultrasonic welding over a flat surface, the area of which is relatively large. This prevents damage to the bonding member to achieve stable welding.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiment. In the drawings:

FIG. 2 is a plan view of a welding head (horn tip) in the embodiment above;

FIG. 3 is a cross-section through line A—A in FIG. 2;

DESCRIPTION OF THE PREFERRED EMBODIMENT

The following is an explanation of an embodiment of the present invention in reference to the drawings.

Figure 1:
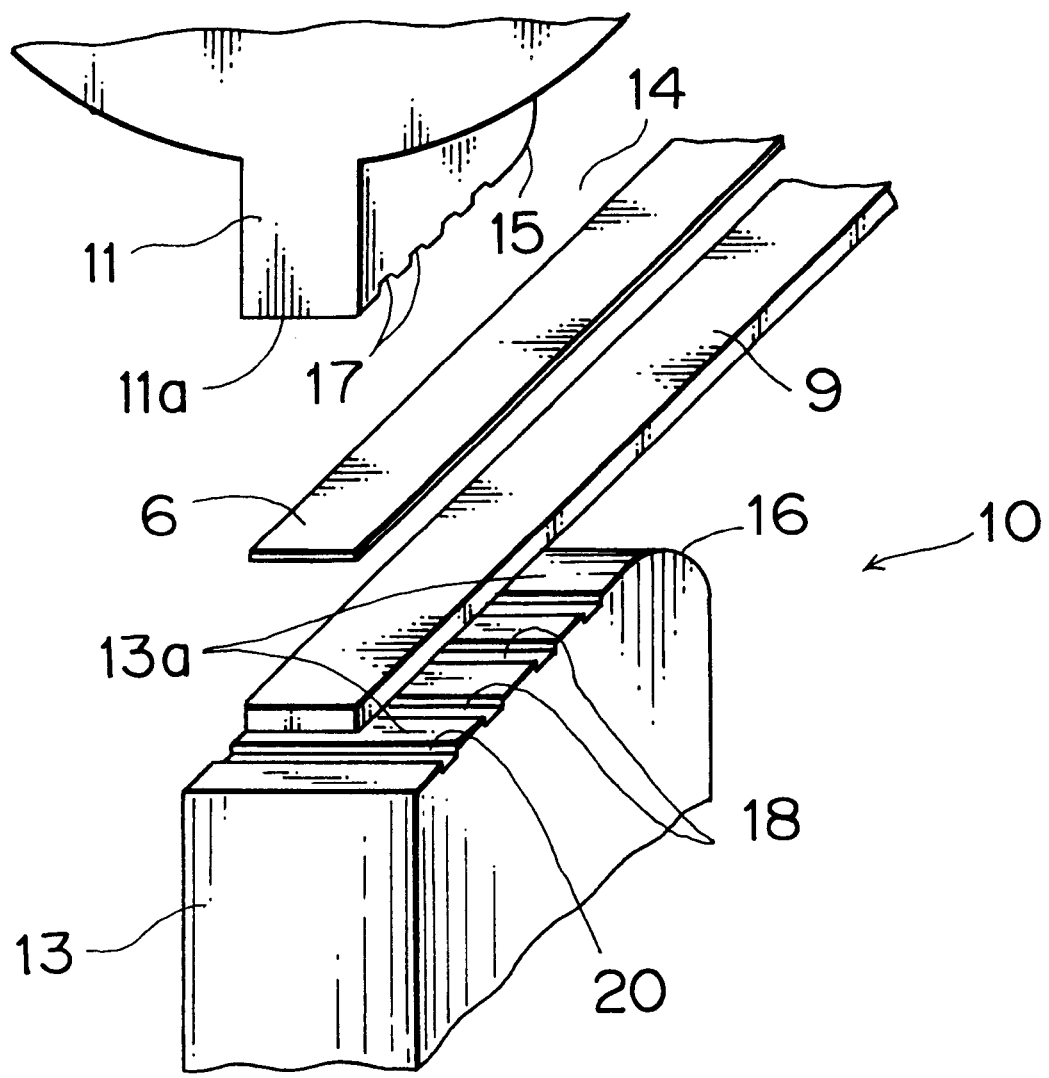
FIG. 1 is an exploded perspective view of an embodiment of the ultrasonic welding machine according to the present invention.
Figure 4:
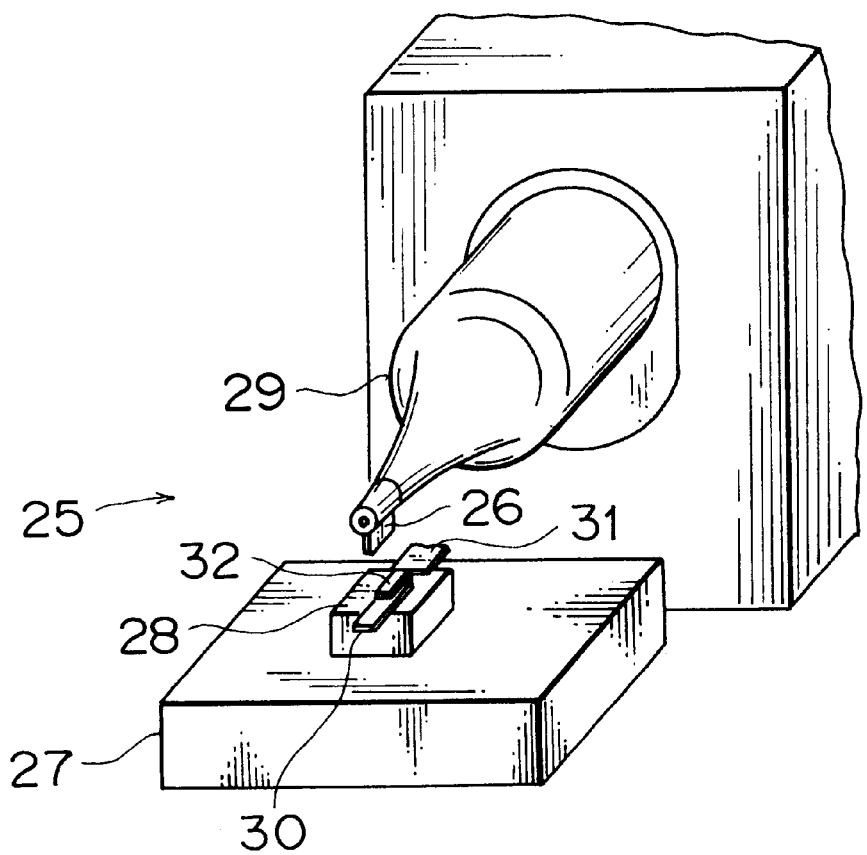
FIG. 4 is an external perspective view of the ultrasonic welding machine.
Figure 5:
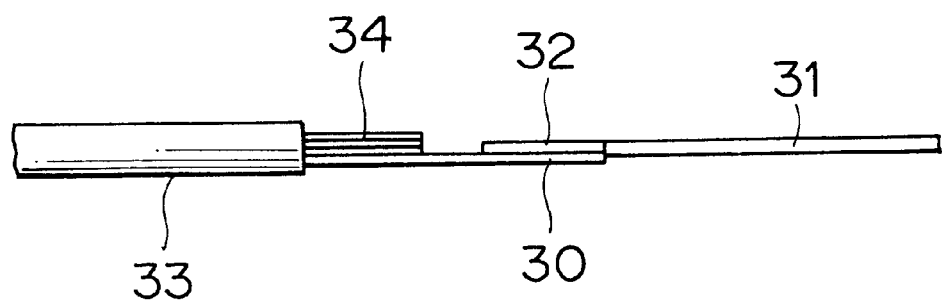
FIG. 5 is a side view showing the structure achieved by welding various bonding members in the prior art.
Figure 6:
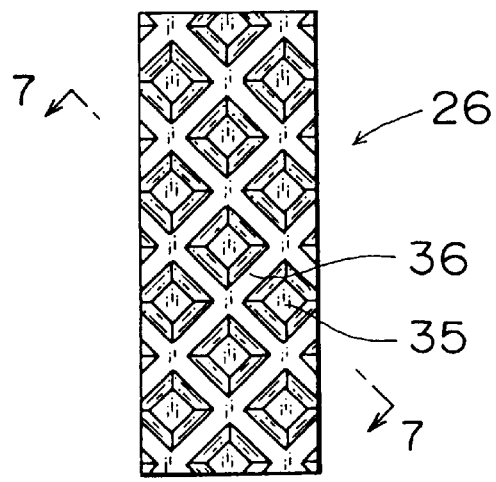
FIG. 6 is a plan view showing the indentations and projections in a horn tip of the prior art.
Figure 7:
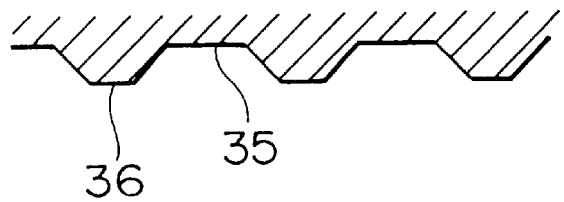
FIG. 7 is a cross-section through line B—B in FIG. 6.
Figure 8:
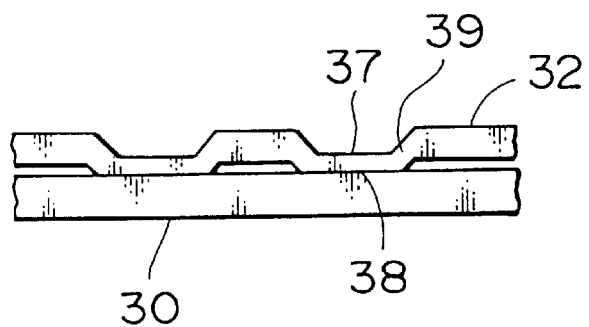
FIG. 8 is a side view illustrating a problem in the prior art.

FIGS. 1–3 show an embodiment of the ultrasonic welding machine according to the present invention.

In an ultrasonic welding machine 10, at a horn tip 11 and an anvil 13, which constitute welding heads, one of which coming in contact with a thin, low strength conductive member, such as a flat conductor 6 or a copper foil (in this embodiment, the flat conductor 6 is in contact with the horn tip 11), gently curved beveled portions 15, 16 are formed toward the insertion opening 14 for the flat conductor, i.e., at the rear end of the welding head, and a plurality of indented grooves 17 and 18, which run at a right angle to the lengthwise direction of the horn tip (the direction of the vibration of the horn tip) are formed in stripes at the lower end surface (machining surface) 11a of the horn tip 11, which is continuous to the curved beveled portion 15 and at the upper end surface (machining surface) 13a of the anvil 13, which is continuous to the curved beveled portion 16.

Flat surfaces 11a, 13a are provided at a consistent height between the individual indented grooves 17, 17 (18, 18), between the front end of the horn tip or the front end of the anvil and the frontmost indented groove 17 (18) and between the curved beveled portion 15 (16) and the rearmost indented groove 17 (18).

While, in FIG. 1, the curved beveled portions 15, 16 and the indented grooves 17, 18 are respectively formed on the horn tip 11 which comes in contact with the flat conductor 6, and the anvil 13 which comes in contact with a bus bar 9, at least one of the welding heads (the horn tip 11 in this embodiment) that comes in contact with the low strength conductive member (flat conductor) 6 must be provided with curved beveled portions 15, 16 and indented grooves 17, 18.

The curved beveled portion 15 may be formed, for instance, at the rear end portion of the horn tip in the lengthwise direction, in the area where the flat conductor 6 projects out when the horn tip 11, is pressed against the flat conductor 6. With this, the shearing stress imposed on the flat conductor 6 during ultrasonic welding is reduced and no welding scars will be formed in the flat conductor 6 by the edges of the horn tip as is the case in the prior art. If the curved beveled portion 15 is formed at the anvil 13, toward the bus bar, or if a stranded conductor 5 is provided below the horn tip 11 as in the structure shown in FIG. 1, the shearing stress imposed on the bus bar 9 and the stranded conductor 5 will be reduced due to the curved beveled portions 15, 16 and scarring and the like will be prevented.

The indented grooves 17 (18) running at a right angle to the lengthwise direction of the flat conductor 6 are formed to have a smaller width $L_2$ than the width $L_1$ of the flat surfaces 11a, as shown in FIG. 2. In addition, as shown in FIG. 3, the grooves are formed to have a depth H, which is relatively shallow and each groove side surface 17a rises on an obtuse angle from the groove bottom 17b so as to open the groove wider near the top, with a gently curved beveled portion 19 formed at each edge where the machining surface (flat surface) 11a and the groove side surface 17a meet. An identical structure is adopted for the indented grooves 18 of the anvil 13.

These stripes of indented grooves 17, 18 impart a holding force against the flat conductor 6 and the bus bar 9 or the stranded conductor 5 that constitute bonding members and the sliding of the bonding members relative to the horn tip 11 and the anvil 13 is prevented. As a result, ultrasonic waves are communicated to the connecting members with a high degree of efficiency. Also, the individual flat surfaces 11a, 13a, which constitute machining surfaces, disperse the pressure generated during ultrasonic welding to a proper degree. Moreover, the curved beveled portions 19, 20 at the edges of the indented grooves 17, 18 and the machining surfaces 11a, 13a prevent scarring of the bonding members. These factors greatly contribute to a reduction in welding scars formed on the flat conductor 6 and the bus bar 9 or the stranded conductor 5 and, in particular, any reduction in the strength of the low strength conductive member 6 is prevented to achieve reliable welding.

As has been explained, with the ultrasonic welding machine according to the present invention, the curved beveled portions (including the curved beveled portions at the indented grooves) at the horn tip or the anvil prevent any shearing stress from being generated on a flat conductor or the like during welding, the indented grooves impart a holding force relative to the bonding members and the flat surfaces disperse the pressure generated during ultrasonic welding to a proper degree. Consequently, damage to the bonding members, in particular, damage to the low strength conductive member such as the flat conductor, is prevented to achieve stable welding strength. Particularly, by forming the indented grooves at a width that is smaller than that of the flat surfaces between them, the pressure generated during ultrasonic welding is dispersed consistently over a wide flat surface area to prevent damage to the low strength conductive member even more effectively.

What is claimed is:

1. An ultrasonic welding machine connecting bonding members to each other through welding between a horn tip and an anvil, wherein:

a curved beveled portion facing said bonding members, a plurality of indented grooves that run at a right angle to a direction of vibration of said horn tip and flat surfaces that come in contact with a bonding member are formed at either one of or both said horn tip and said anvil.

2. An ultrasonic welding machine according to claim 1, wherein;

said curved beveled portion, indented grooves and flat surfaces are formed facing opposite a low strength conductive member such as of a flat conductor which constitutes a bonding member.

3. An ultrasonic welding machine according to claim 1, wherein;

said indented grooves are formed to have a shallow depth and to open the groove wider near the top.

4. An ultrasonic welding machine according to claim 1, 2 or 3, wherein:

said indented grooves are formed at a width that is smaller than a width of said flat surfaces provided between said indented grooves and curved beveled portion are formed at edges where side surfaces of said indented grooves meet said flat surfaces.

* * * * *